F. KRAUSE.
SLED.
APPLICATION FILED MAY 7, 1913.
1,117,860.
Patented Nov. 17, 1914.
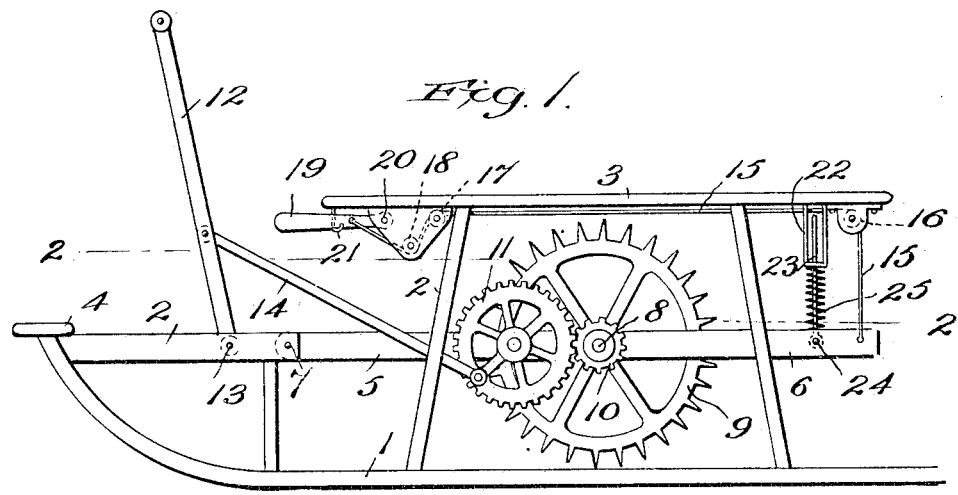
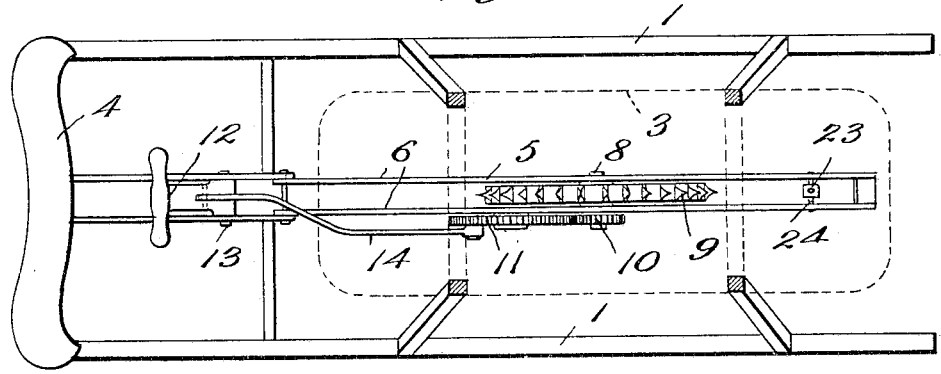
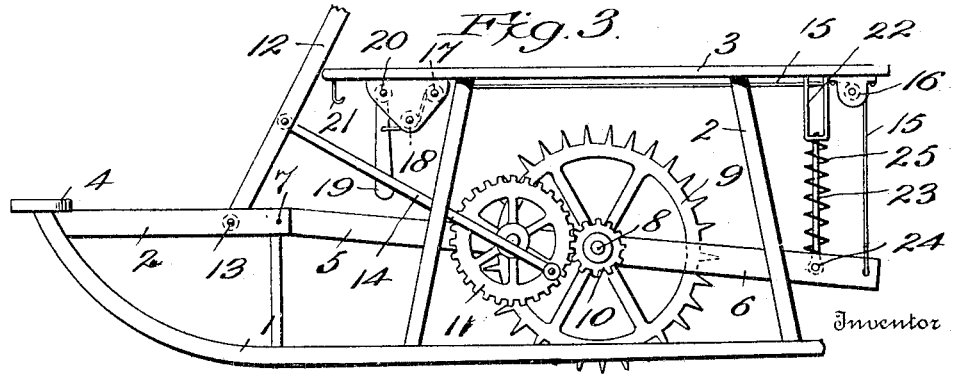
Witnesses
C. James Cronin
Fred M. Price Jr.
Inventor
Franz Krause
By Victor J. Evans
Attorney

UNITED STATES PATENT OFFICE.

FRANZ KRAUSE, OF NEW YORK, N. Y.

SLED.

1,117,860.  Specification of Letters Patent.  Patented Nov. 17, 1914.

Application filed May 7, 1913. Serial No. 766,151.

*To all whom it may concern:*

Be it known that I, FRANZ KRAUSE, a subject of the Emperor of Austria, residing at New York city, in the county of New York and State of New York, have invented new and useful Improvements in Sleds, of which the following is a specification.

This invention relates to sleds and has for its general object to provide a sled with a self-propelling means, whereby the user himself may manually propel the sled over the surface of snow or ice without being otherwise assisted.

Another object of the invention is to provide a means for throwing the propelling means into and out of operative contact with the snow or ice to permit the sled to coast.

To these ends the invention consists in the novel details of construction and combination of parts more fully hereinafter described and particularly pointed out in the claim.

Referring to the accompanying drawings forming a part of this specification in which like numerals designate like parts in all the views:—Figure 1 is a side elevational view of my improved sled showing the spurred propelling wheel thrown out of operation. Fig. 2 is a horizontal sectional view taken on the line 2—2 of Fig. 1. Fig. 3 is a side elevational view showing the spurred propelling wheel thrown into operation.

The sled may be of any design and comprises the runners 1, frame 2 and seat board or platform 3. The runners may be of the usual flexible type now employed in sled construction and connected to the front cross bar 4 for steering the sled when desired.

A movable swinging frame 5 comprising a pair of parallel bars 6, is pivotally connected at one end as at 7 to the frame 2 and within this movable frame is mounted the axle 8 of the traction or propelling wheel 9 for propelling the sled over the surface of the ice or snow. This wheel is provided around its periphery with spurs for making positive engagement with the icy surface, so as to utilize to the best possible advantage the propelling of the device. The axle 8 carries on one end a pinion 10 which meshes with a crank gear 11 pivotally mounted on the movable frame 5. Motor mechanism of any preferred kind may be employed to drive the gearing, but I have shown the sled as adapted for manual propulsion. An oscillating hand lever 12 is mounted as at 13, to the front portion of the frame 2 so as to be conveniently operated by the rider and is connected with the crank gear 11 by a rod 14, whereby on oscillating the lever the gearing will be driven.

To the rear end of the movable frame 5 is connected the operating rope or wire 15 for raising and lowering the propelling wheel when desired. This wire or rope after passing upwardly and over the sheave 16 and then forwardly and around the sheaves 17 and 18, all of which are mounted on the under-side of the seat board 3, is then connected to the operating lever 19. By means of the lever 19 which is pivotally connected as at 20 to the under side of the seatboard, the frame 5 may be adjusted to raise or lower the propelling wheel so that its spurs or teeth may contact with the ice or snow when desired. The lever is located at the forward end of the seat-board and is adapted when in its inoperative or horizontal position, to be engaged and held by a cleat 21.

Mounted on the under side of the seatboard, at the rear end thereof, is a U-shaped bracket 22 in which is slidably mounted one end of a rod 23, the other end of which is pivotally connected as at 24 to the rear end of the movable propelling frame 5. A coil spring 25 surrounds the rod between the bracket and wheel frame and exerts pressure thereon to normally force the propelling wheel downwardly. When the propelling wheel is in its operating position it will be seen that its spurs are projected by the spring pressure against the surface of the ice or snow and that by the yielding pressure on the wheel the same will be protected against irregularities on the surface of the ice or snow.

It is obvious that those skilled in the art may vary the details of construction and arrangements of parts without departing from the spirit of my invention and therefore I do not wish to be limited to such features except as may be required by the claim.

What is claimed as new is:

In a sled, the combination of a frame provided with a seat-board, a vertically swinging frame comprising a pair of parallel side bars pivotally connected at one end to the frame, a propelling wheel mounted within the swinging frame, means for manually imparting motion to the propelling wheel, an operating lever pivotally connected to the seat board, a flexible means connected to the operating lever and swinging frame for raising and lowering the propelling wheel, a spring-actuated rod connected to the swinging frame and engaging the seat-board for exerting pressure on the swinging frame, substantially as described.

In testimony whereof I affix my signature in presence of two witnesses.

FRANZ KRAUSE.

Witnesses:
EDWARD HARBAN,
JOSEPH ZIMMER.

Copies of this patent may be obtained for five cents each, by addressing the "Commissioner of Patents, Washington, D. C."